United States Patent [19]

Circenis

[11] Patent Number: 5,758,155

[45] Date of Patent: May 26, 1998

[54] METHOD FOR DISPLAYING PROGRESS DURING OPERATING SYSTEM STARTUP AND SHUTDOWN

[75] Inventor: Edgar Circenis, Ft. Collins, Colo.

[73] Assignee: Hewlett-Packard Company, Palo Alto, Calif.

[21] Appl. No.: 882,548

[22] Filed: Jun. 25, 1997

Related U.S. Application Data

[63] Continuation of Ser. No. 324,830, Oct. 18, 1994, abandoned.

[51] Int. Cl.$^6$ ........................................ G06F 9/45
[52] U.S. Cl. ........................................ 395/652
[58] Field of Search ........................... 395/651, 652

[56] References Cited

PUBLICATIONS

Reiss et al. "Unix System Administration Guide." Osborne McGraw–Hill, Berkeley, CA. 1993. pp. 220–248. 1993.
Anderson et al. "The Unix C Shell Field Guide." Prentice–Hall. Englewood Cliffs, NJ. 1986. pp. 25, 33, 53–54, 131–132, 172–173, 237–242, 309–312. 1986.

Primary Examiner—James P. Trammell
Assistant Examiner—Peter J. Corcoran, III

[57] ABSTRACT

A system for initially loading an operating system into a computer. The system provides a startup sequencer with a user interface that queries each startup script to obtain a description of what function the script will perform when it is executed. The user interface then presents a list of the descriptions on the screen. As each script is executed, the return status is placed on the screen alongside the description. The system presents a shutdown list and status when the operating system is being shut down. Each script supplies a description when it is executed with a parameter requesting the description, thus providing flexibility in the information displayed. For operating systems that have multiple run levels, a separate file directory of scripts to be run for each run level is provided, wherein the directory contains the scripts to be executed in taking the operating system to the new level.

13 Claims, 7 Drawing Sheets

METHOD FOR DISPLAYING PROGRESS DURING OPERATING SYSTEM STARTUP AND SHUTDOWN

CROSS REFERENCE TO RELATED APPLICATION

This is a continuation of application Ser. No. 08/324,830 filed on Oct. 18, 1994, now abandoned.

FIELD OF THE INVENTION

This invention relates to computer systems and more particularly to operating system software within such computer systems. Even more particularly, the invention relates to the initial loading of operating system software into a computer.

BACKGROUND OF THE INVENTION

The Process of starting up a computer from a halted or powered down condition is called bootstrapping. During bootstrapping, the operating system is loaded into memory and its execution is started. A variety of initialization tests are performed, and the system is then made available to the users of the system. Because none of the normal operating system functionality is available while the computer is being initialized, the computer must "pull itself up by its bootstraps," so to speak; hence the name bootstrapping. Bootstrapping is often abbreviated to booting, or the boot process.

During the boot process, the operating system typically checks the hardware upon which it is running, to insure that the hardware is functioning properly. The operating system also typically checks the computer file system to insure that it does not contain inconsistencies or errors. The operating system sets up background tasks that need to be performed, for example, a print process to copy spooled output to the printer; the system loads networking software to start the networking process; the system uses the networking software to establish network connections to other computer systems; and the operating system performs many other operations during the boot process.

Booting is often a very mysterious area of operating systems, even for the most seasoned computer users. Prior art operating systems typically display nothing or very little while the boot process is being performed. For example, the PC DOS operating system provides no information until it starts the "autoexec" file, and then it provides a list of the programs run through this file. Similarly, the windows operating system provides a logo screen and no other information until it asks for a password or if no password is required, until it presents the main screen of icons. Sometimes operating systems will display error messages if the boot process goes incorrectly, however, this is not always the case and sometimes the computer system will simply stop. What is actually displayed is very dependent upon the discretion of the individual programmer that created the program being run during the boot process, and is therefore very inconsistent.

Operating systems sometimes have various run, or operating, levels, so in addition to starting from a powered down or halted condition, the boot process is also used to change from one run level to another. For example, some varieties of the Unix operating system have several run levels. The first run level, run level zero, is a single user level, which does not allow more than one user to use the system. Run level one is used for system configuration during the boot process. Run level two is the multi-user run level where many people can use the computer system, however, the system cannot operate as a network server. Level three is the multi-user level which includes complete networking, including allowing the machine to operate as a network file server. The bootstrapping process is used to change from any level to any other level, including moving to higher levels when the system is being started, but also including moving to lower levels as the system is being shutdown or as the scope of available services is being reduced.

In prior art Unix systems, the scripts or programs that are run during the boot process are typically contained in a single directory, and the parameters used by these programs are embedded within the program code. Although some systems provide multiple directories, there is no significance to the directories other than just providing a way of breaking a single directory into smaller parts.

This causes several problems for the user, the most significant of which is that the user does not know what script or program the computer system is performing during the various stages of the boot process. If something goes wrong during the process, sometimes an error message will be displayed to the user, however, this may flash past the user very quickly as other messages are being presented on the console video display device, and the error message may be lost. In extreme cases, rather than presenting an error message, the system simply locks up or "hangs" with the user not having any indication of what has failed. In addition, the current methods are not very extensible to provide any newer methods that might be of more use to a user.

There is need in the art then for a method of bootstrapping the operating system on a computer that provides more information to a user of the computer as to the steps of the bootstrapping process are performed. The present invention meets this and other needs in the art.

SUMMARY OF THE INVENTION

It is an aspect of the present invention to provide a method of starting an operating system within a computer system.

It is another aspect of the invention to provide such a method that provides a description of all startup scripts or programs being run during the startup.

Another aspect of the invention is to provide a visual indication of the results of performing each startup script or program, after each is executed.

Yet another aspect is to provide a method wherein each script or program provides its description when called by the startup software.

Still another aspect of the invention is to provide, during shutdown of the operating system, the same methods provided during startup of the operating system.

A still further aspect is to provide the startup or shutdown methods when changing from one run level to another.

The above and other aspects of the invention are accomplished in a system that provides a startup sequencer and a user interface that queries each startup script, or program, to obtain a description of what the startup script will do when it is executed. The system then presents a list of these descriptions to the user, on the computer system console screen, and as each startup script is executed, the system places the status of the execution on the screen alongside the description. This provides a clear visual indication to the user of the system as to which scripts will be performed during the startup, and the status of each script as it is being performed. In addition, scripts sometimes do nothing during startup because of conditions in the computer system at the time they are executed. This is also indicated on the screen so that the user is aware that script did not perform any function.

Similarly, when the operating system is being shut down, a list of shutdown scripts is also provided and the status of each, as it is executed, is shown on the screen.

For operating systems that have multiple run levels, the present invention provides a separate file directory of scripts to be run for each run level. Thus, when the system is changing from one run level to another, the system knows, through the directory name, exactly which directories contain the scripts to take the operating system to the new level. This provides ease of extensibility and organization so that it is very easy for a user to put a new script into the operating system, and to identify that the script needs to be performed when changing from one run level to another.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The following terms and definitions are used in the description of the invention:

Program—executable computer instructions that perform a desired function.

Script—one or more programs performed as a group. When a script includes more than one program, the programs are performed in a defined sequence within the script.

Start-message parameter—a parameter passed to a script to cause it to provide a description of the functions it will perform when it is executed to cause the operating system to run at a higher run level.

Stop-message parameter—a parameter passed to a script to cause it to provide a description of the functions it will perform when executed to cause the operating system to run at a lower run level.

Start parameter—a parameter passed to a script to cause it to perform functions that will cause the operating system to run at a higher level.

Stop parameter—a parameter passed to a script to cause it to perform functions that will cause the operating system to run at a lower level.

Return code—a code returned by a script after it completes processing. The return code is a value that indicate that the script either: completed successfully; failed; requested a reboot; or did not perform any functions (i.e. not applicable).

Figure 1:
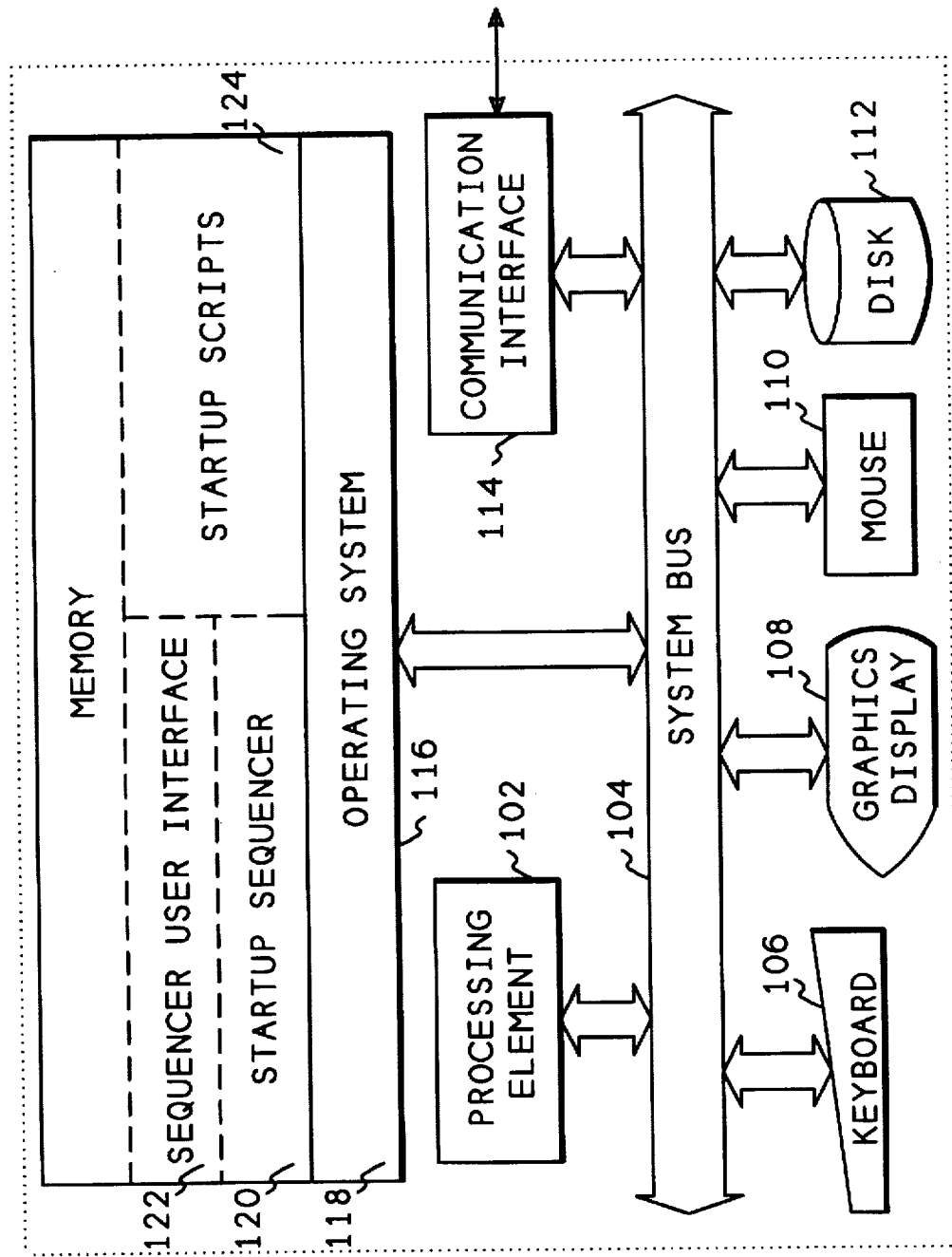
FIG. 1 shows a block diagram of a computer system incorporating the present invention.

FIG. 1 shows a block diagram of a computer system incorporating the present invention. Referring now to FIG. 1, the computer system 100 contains a processing element 102 which communicates to other elements of the computer system 100 over a system bus 104. A keyboard 106 allows text input to the computer system 100 and a mouse 110 allows graphical locator input to the computer system 100. A graphics display 108 provides for graphics and text output to be viewed by a user of the computer system 100. A disk 112 stores an operating system and other data used by the computer system 100, for example the startup and shutdown scripts as well as configuration data for the scripts would normally reside on the disk 112. The computer system 100 communicates to other computer systems (not shown) through a communications interface 114, to provide networking services for the user of the computer system 100.

A memory 116 contains an operating system 118, which may be any one of several operating systems, and may, typically, be the UNIX® operating system (UNIX is a registered trademark of Unix System Laboratories and AT & T). The memory 116 also contains the startup sequencer 120 and the startup sequencer user interface 122, of the present invention, as well as an area 124 for loading the startup scripts used with the present invention.

Figure 2:
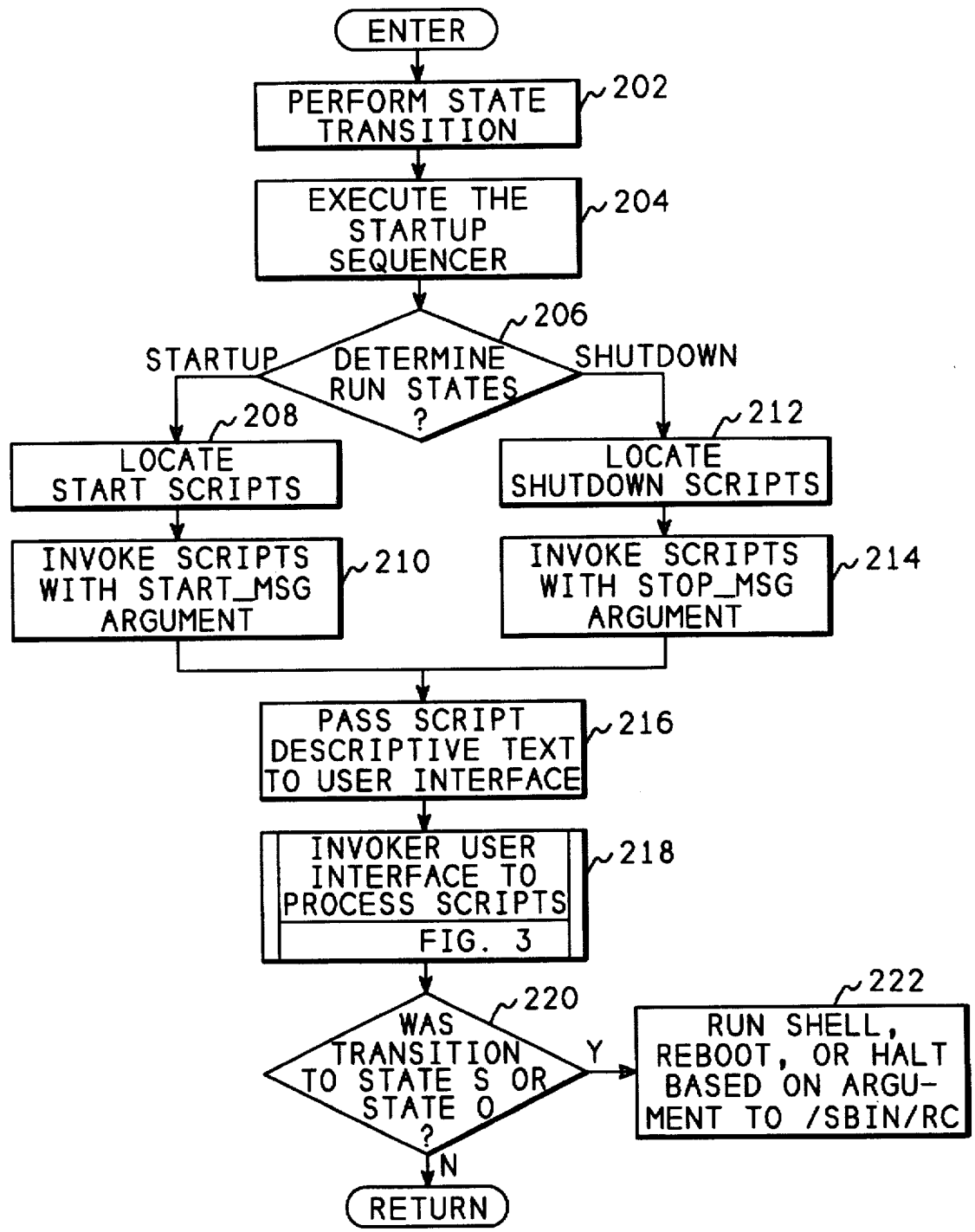
FIG. 2 shows a flowchart of the initialization software of the present invention.

FIG. 2 shows a flowchart of the process of changing the operating system from one level to another, including steps performed by initialization software, and also the steps performed by the startup sequencer 120 of FIG. 1. Referring now to FIG. 2, when the system is started, or the user enters a command to change the run level from one run level to another, the initialization software that receives the command first performs a state transition to determine the new run level into which the operating system will be placed.

When the system is being started, the new run level will initially be the S or single user level, however, when a level transition command is entered, the user specifies the new run level. Once the new run level is set, block 204 checks the /etc/inittab file to determine the sequencer program to execute in order to cause the level transition. In the present invention, the name of this sequencer is simply "rc" and it is stored in a directory called "sbin". After determining the sequencer to execute, the initialization software starts this sequencer.

Once the startup sequencer is functioning, it takes over control and performs the remainder of the flowchart of FIG. 2. Block 206 then determines the old and new run levels, which were stored by block 202. If the new run level is a higher number than the old run level, the system is performing a startup operation, so block 206 transfers to block 208. Block 208 locates the startup scripts for the new run level, in a directory set aside for the specific run level. That is, a separate directory for each run level contains all the scripts to take the operating system to the particular run level. For example, there is a directory for run level one, which contains all the scripts that need to be executed to take the operating system from run level zero to run level one during startup, and the directory also contains all the scripts that need to be executed to take the operating system from run level two down to run level one during the shutdown process.

Once block 208 locates all the startup scripts for the new run level, block 210 invokes each of these scripts with a start-message parameter. When invoked with a start-message parameter, a script is required to provide a description of the work it will perform when it is later invoked with a start parameter to perform the work. That is, the start-message parameter does not cause the script to perform its function, instead, it causes the script to provide a short description of the function that will be performed at a later time. The script typically provides this description by returning a value, wherein the value is usually a text string containing the description, although the description could be provided in many different ways. Thus, block 210 invokes all the scripts for this run level so that each one of the scripts can provide its description, thus completing a list of all the scripts that will be performed. Control then goes to block 216.

If block 206 determined that the run level was moving from a higher level to a lower level, for example from level four to level three, then a shutdown is in process so block 206 transfers to block 212. Block 212 locates all the shutdown scripts that will take the operating system to the new desired level, and block 214 invokes each of these scripts with a stop-message parameter which causes the script to provide description of what will be performed when the script is later executed. Control then goes to block 216.

Figure 3:
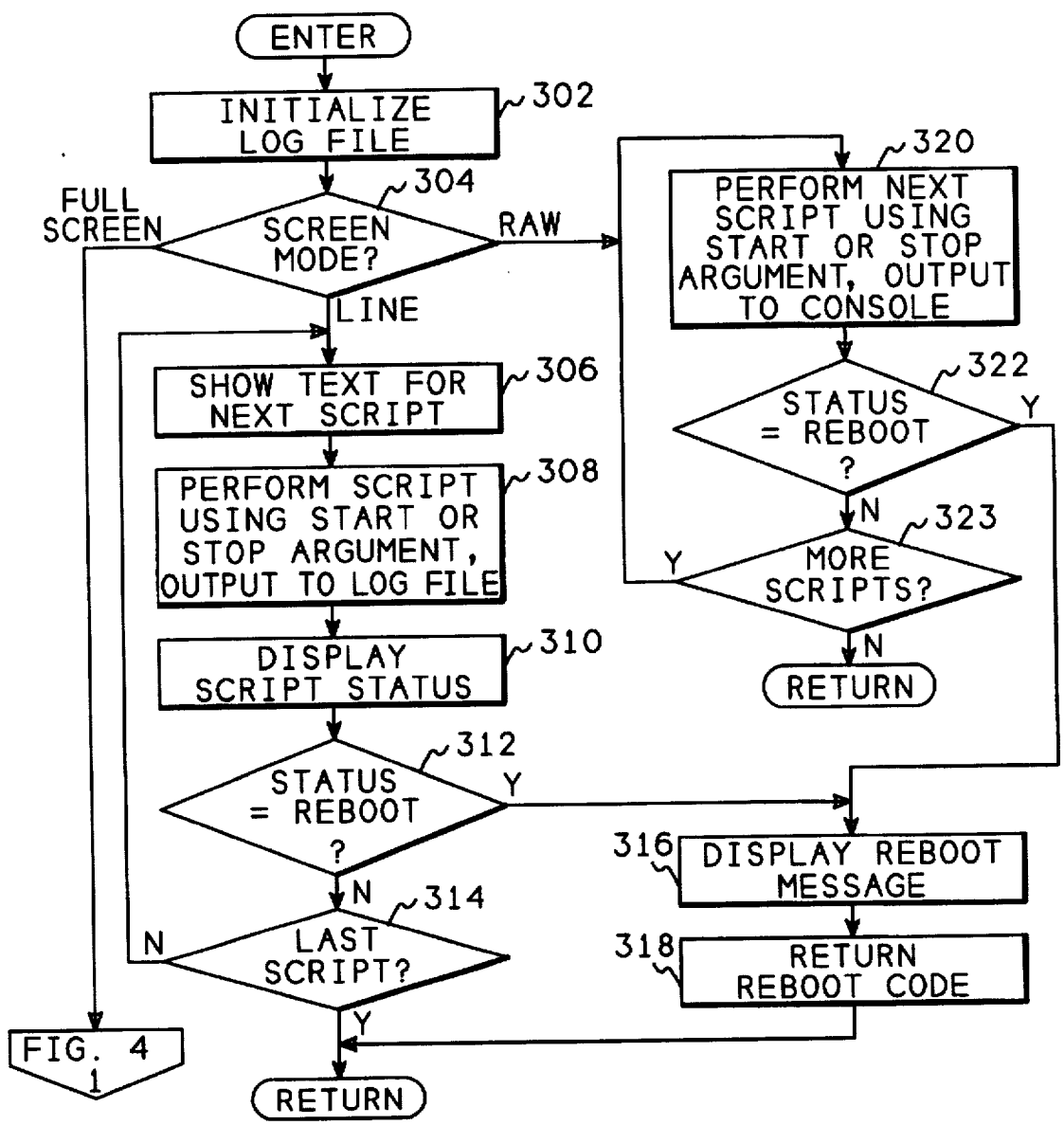
FIGS. 3 and 4 show a flowchart of the user interface processing software of FIG. 2.

After the descriptions of what the scripts will perform have been obtained, block 216 passes the descriptive text for each of the scripts to the user interface, and then block 218 calls FIG. 3 to invoke the user interface to process each of the scripts. After the scripts have been processed, control returns to block 220 which determines whether the transition was into level S or level zero, thus indicating that the system is to be halted. If so, block 220 goes to block 222 which reboots or halts the system depending on the return code and the current run level. If the transition was to some other level, block 220 simply returns, thus, terminating the startup sequencer, and allowing the operating system to run in the new level.

Figure 4:
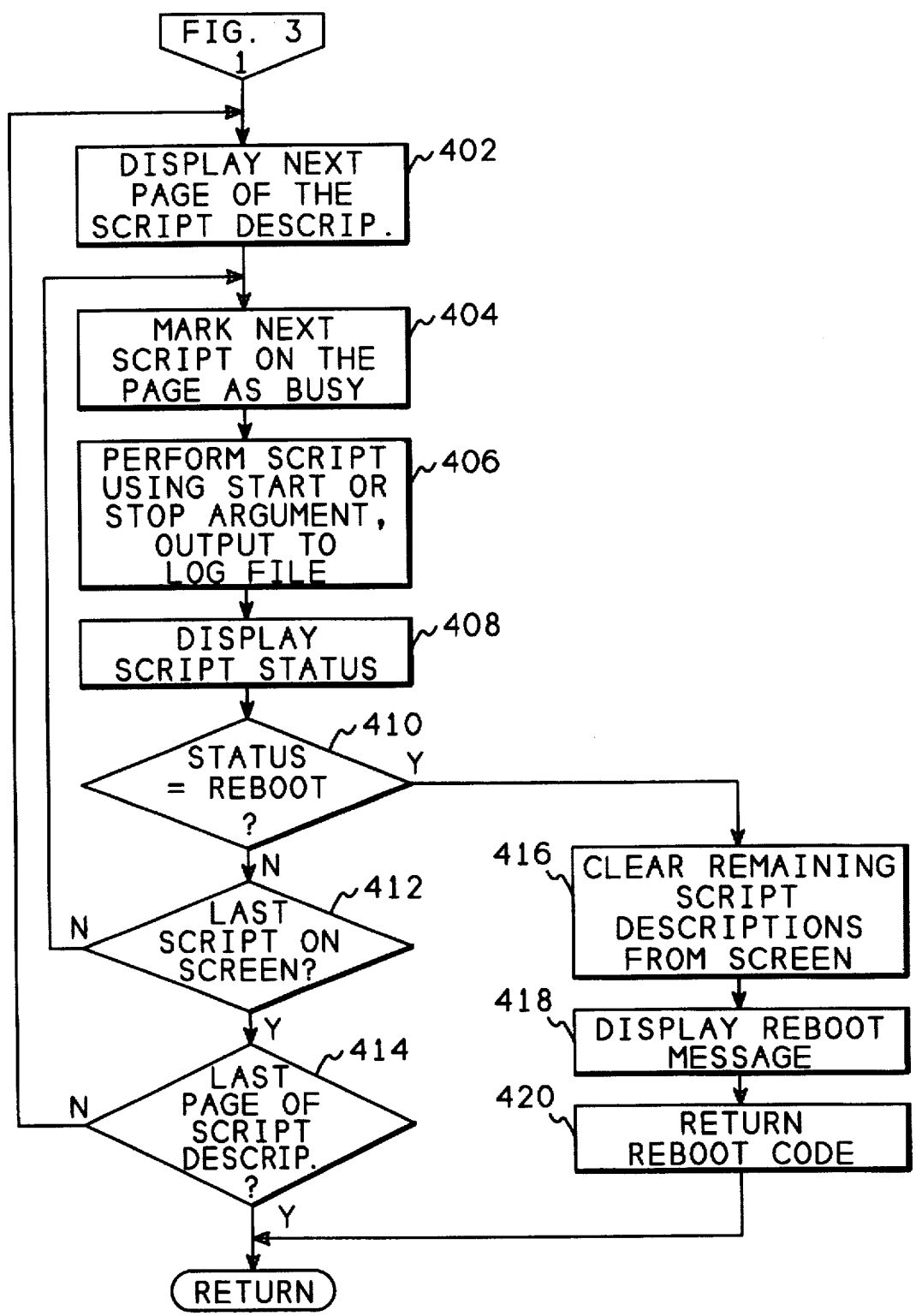

FIGS. 3 and 4 show a flow chart of the sequencer user interface 122 of FIG. 1, which is called from block 218 of FIG. 2. Referring now to FIG. 3, after entry, block 302 initializes a log file so that the output from the various scripts can be written to the log file for use later in debugging any problems that might occur. Block 304 then determines the screen mode for the console being used.

Three different types of consoles are supported by the invention, thus the user interface has three different modes to support the three types of consoles. In raw mode, data is written directly to the console by the scripts, thus, preventing the user interface from adding any additional information. In full screen mode, the complete list of scripts that will be run is placed on the screen, and as each script is run the status is put alongside the descriptive line of text for the particular script. Thus, full screen mode provides the user with a list of everything that will be run during the boot process, and it also provides the status as each script is run. In line mode, data is sent from the scripts back through the user interface which allows the user interface to add the status onto the line before or after the line is displayed. However, the descriptive text for each script is displayed just before the script is run, and so the system does not present a list of scripts to the user, as is done in full screen mode.

If the console will be accessed using raw mode, block 304 transfers to block 320 which performs the first or next script passing the start or stop parameter, depending on whether the system is in startup mode or shutdown mode, and it directs the output of the script directly to the console. After the script has completed execution, block 320 goes to block 322 which determines whether the status returned by the script indicates that the system needs to reboot, and if it does, block 322 transfers to block 316 to perform the reboot. If the status returned by the script does not indicate a need for a reboot, block 322 goes to block 324 which determines whether there are more scripts to be processed. If there are more scripts to be processed, block 324 returns to block 320 to process the next script. After all scripts have been processed block 324 returns to the startup sequencer FIG. 2.

If the console will be accessed using line mode, block 304 transfers to block 306 which displays the text for the next script to be executed on the next line of the console. Block 308 then performs the next script using the start or stop parameter, depending on whether the system is in startup or shutdown mode, and directs output from the script to the log file, since the console is not normally used for script output when in line mode. After the script is complete, block 310 displays the status returned by the script on the end of the line containing the text description. Then block 312 determines whether the script returned a status indicating that the system needs to reboot. The script will return a status of reboot when the function of the script determines that the system needs to be rebooted in order to continue. If the status is reboot, block 312 goes to block 316 which displays a reboot message, and then block 318 returns a reboot code to the startup sequencer to cause block 220 (FIG. 2) to transfer to block 222 (FIG. 2) and reboot the system.

If the status is not to reboot, block 312 goes to block 314 which determines whether this is the last script, and if it is not, block 314 returns to block 306 to process the next script. After all scripts have been processed, block 314 returns to FIG. 2.

When block 304 determines that the system is capable of full screen mode, block 304 transfers to block 402 of FIG. 4. Block 402 displays an entire page of the descriptive text for the scripts that are to be run. If more than one page of descriptive text is available, block 402 displays the first or next page of descriptive text. Block 404 then marks the script description on the page for the next script to be executed as busy. Block 406 performs the script associated with the description using the start or stop parameter, depending on whether the run status is startup or shutdown. Output for the script is directed to the log file as it was in line mode described above. After the script has completed processing, block 408 displays the script status next to the description for the script on the page and block 410 determines whether the status returned from the script requires a reboot of the system. If the status is reboot, block 410 goes to block 416 which clears the remaining script descriptions from the screen and then block 418 displays the reboot message. Block 420 then returns a reboot code to block 220 of FIG. 2 which reboots the system.

If the status was not equal to reboot, block 410 goes to block 412 which determines whether the last script for this screen has been executed and if not, block 412 returns to block 404 to mark the next script on the page as busy, and to execute that script. After all scripts on a screen have been performed, block 412 goes to block 414 which determines whether this is the last page of the script descriptions and if not, block 414 returns to block 402 which displays the next page of the script descriptions and performs those scripts. After all pages of script descriptions have been performed, block 414 returns to FIG. 2.

Figure 5:
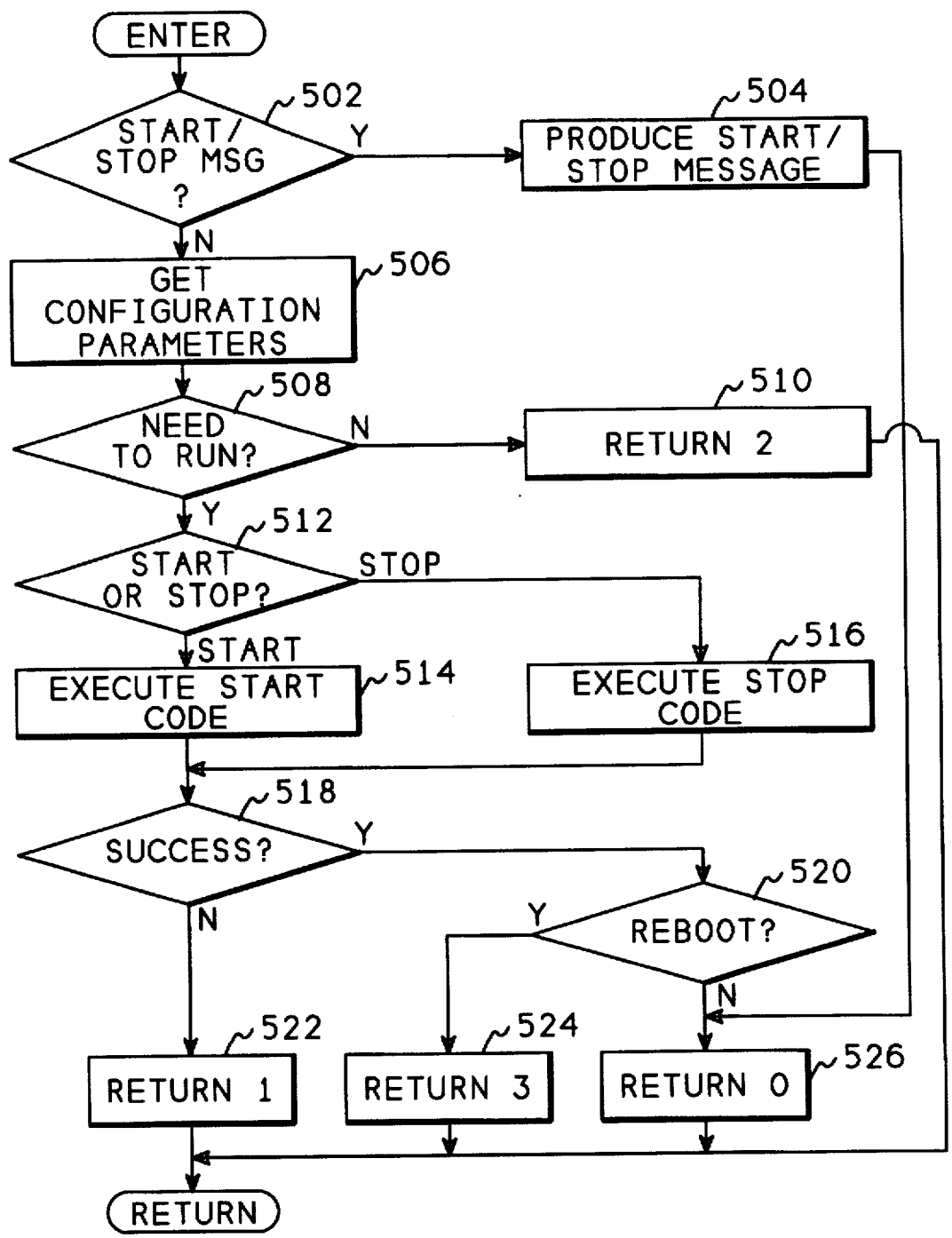
FIG. 5 shows a flowchart of a typical startup script or program that would be called from FIG. 4.

FIG. 5 shows a flowchart of a typical startup script or program that would be called from FIGS. 2, 3, or 4. Referring now to FIG. 5, after entry, block 502 determines whether the script has been passed a start-message parameter or a stop-message parameter. If so, block 502 transfers to block 504 which produces the start or stop message and then returns to its caller. This is the section of code that is executed when the script is called from either block 210 or block 214 of FIG. 2.

If the start-message or stop-message was not passed as a parameter, block 502 transfers to block 506 which gets configuration parameters. These are obtained from the file in the /etc/rc.config.d directory as will be described below with respect to FIG. 7. After obtaining the configuration parameters, block 508 determines whether this script needs to run. Given the configuration parameters obtained from block 506, and given the existing machine configuration, the script may not need to be performed. If this is so, block 508 transfers to block 510 which returns a return code of "2" to its caller, indicating that this script is not applicable at this time.

If the script does need to run, block 508 transfers to block 512 which determines whether the script was passed a start or stop parameter, thus indicating whether the system is starting up, which would cause a start parameter to be passed, or whether the system is shutting down, which would cause a stop parameter to be passed.

If the parameter is a start parameter, block 512 goes to block 514 which executes whatever code is necessary in this script to perform a transition from a lower run level to a higher run level, as would occur during startup. If the parameter passed is a stop parameter, block 512 transfers to block 516 which executes whatever code would be necessary to transit from a higher run level to a lower run level, during shutdown mode. After performing either the start or stop code, control goes to block 518 which determines whether the code performed successfully and if not, block 518 transfers to block 522 which returns a return code of "1" indicating that the script failed.

If the script was successful, block 518 transfers to block 520 which determines whether the script requires that the operating system be rebooted. If so, block 520 transfers to block 524 which returns a return code of "3" indicating that a reboot should occur. If a reboot is not required, block 520 transfers to block 526 which returns a return code of "0" indicating that the script was successful.

Figure 6:
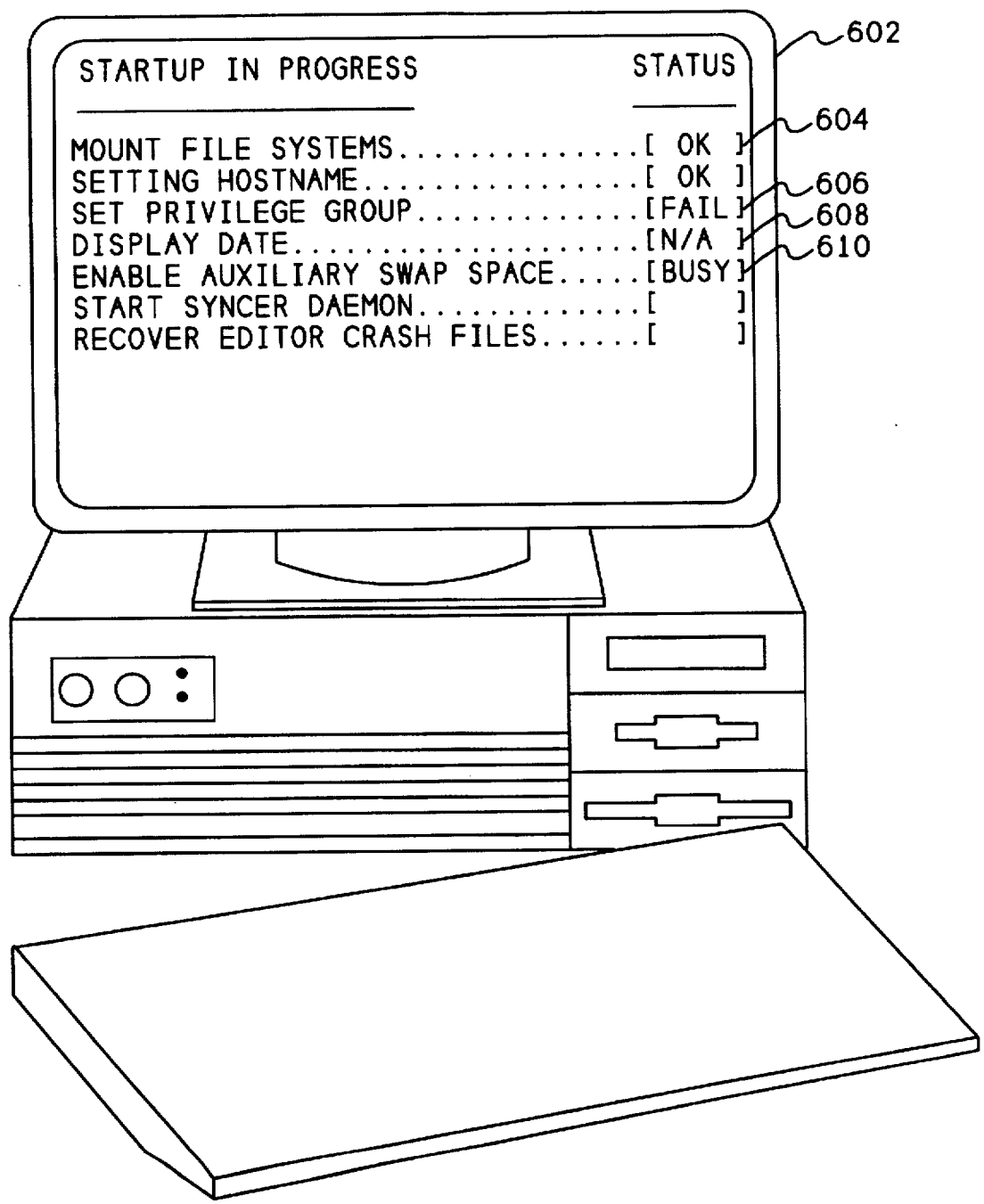
FIG. 6 shows the output of the initialization software.

FIG. 6 shows a computer console displaying script descriptions during the boot process. Referring now to FIG. 6, a system console 602 shows a list of script descriptions as they are being processed during booting. Line 604 shows that a mount file system script has been processed and was successful, thus, the status is "OK". Line 606 shows a set privilege group script that failed and line 608 shows a display date script that was not applicable and did not need to run. Line 610 shows the currently executing script which is the "enable auxiliary swap space" script so the status indicates that this script is busy.

There are five status indicators that can be displayed for a particular script. "OK" indicates that the script was processed successfully and returned a return code of "0". "FAIL" indicates that the script was processed, however, one or more errors occurred which prevented the script from completing successfully, so it returned a return code of "1". "N/A" indicates that the script was executed, however, the script determined that it did not need to perform any function, therefore, it returned a return code of "2". "BOOT" indicates that a script was performed successfully and it returned a return code of "3", indicating that the system needed to be rebooted. The last status, "BUSY" indicates that the script is currently being performed.

In addition to the five statuses, color may also be used to indicate the status of a particular script. Typically, green might be used to indicate success, red might be used to indicate failure and/or reboot, and yellow might be used for busy and/or not applicable.

Figure 7:
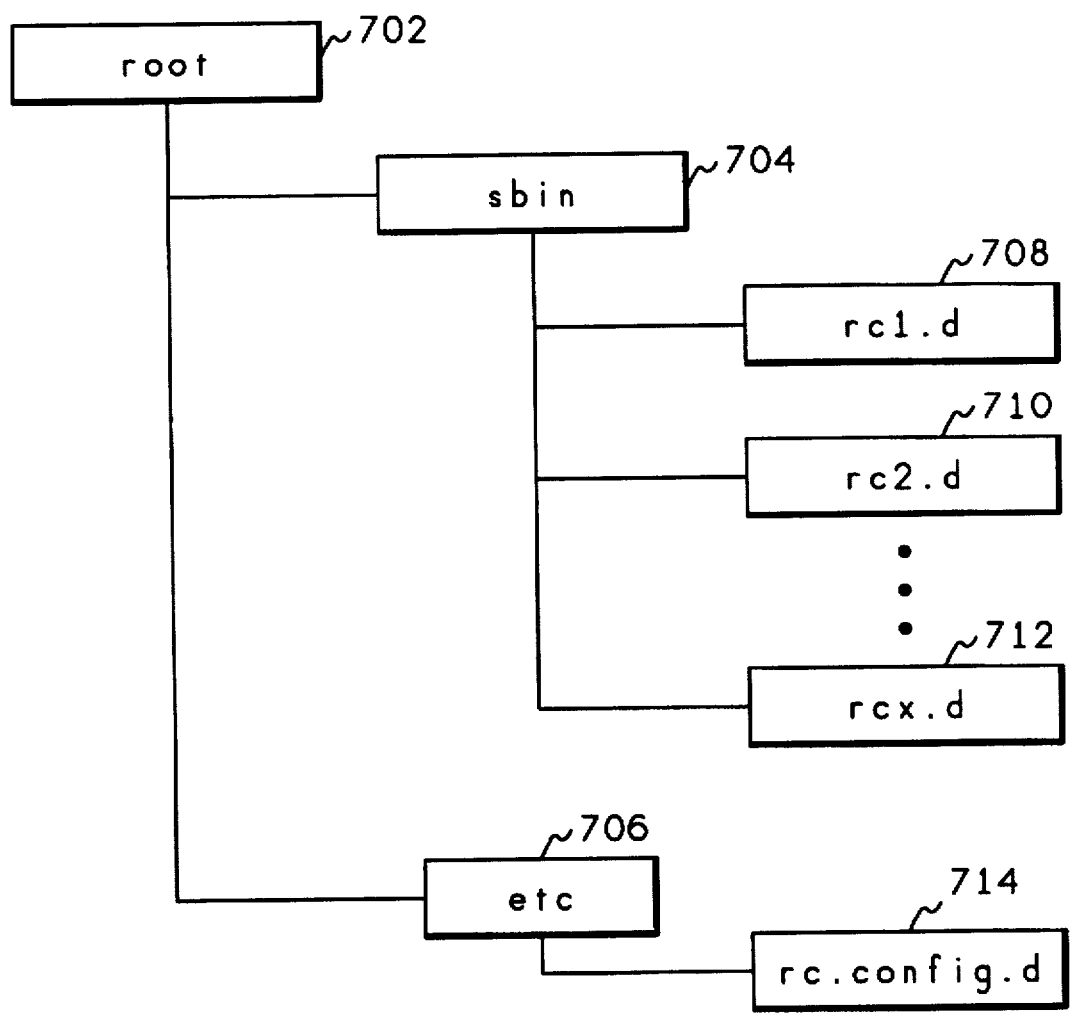
FIG. 7 shows the file structure of the invention.

FIG. 7 shows the file structure used with the present invention. Referring now to FIG. 7, the root directory, which is the topmost directory of a UNIX operating system, contains two directories that are used during the boot process within the system of the present invention. SBIN directory 704 contains a series of sub-directories rc1.D 708, rc2.D 710, through rcX.d, where X is the highest run level used with the system. In this scheme, rc1.D contains all scripts necessary to bring the system up to level one or to shut down the system from level two to level one. Similarly, rc2.D contains all scripts necessary to take the system from level one to level two or to take the system from level three down to level two. For each level in which the system can operate, there is a directory labeled rcX.D, where X is the level.

The directory etc 506 contains a sub-directory rc.config.d 714 which contains all the configuration information. By placing all the configuration information in the rc.config.d, the system avoids having configuration information embedded within the scripts contained in the sbin directories.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method of initially loading an operating system into a computer, said method comprising the steps of:

(a) selecting at least one script to be displayed and executed to complete said loading, wherein each script performs at least one program;

(b) first executing each script selected in step (a) while providing data to each script selected in step (a) to cause each script selected in step(a) to only return a script description and not perform said at least one program; and (c) displaying each script description returned in step (b) before executing each script selected in step (a) a second time while providing data to each script selected in step (a) to cause each script selected in step (a) to perform said at least one program.

2. The method of claim 1 further comprising the step of:

(d) displaying a completion indicator along with said corresponding script description after each selected script is executed said second time.

3. The method of claim 2 wherein step (c) further comprises the following step (c1), and wherein step (d) further comprises the following step (d1):

(C1) displaying a list of said corresponding script descriptions on an output console device of said computer system prior to executing a first of said selected at least one script; and (d1) displaying said completion indicator for each script on a same a line of said output console device that contains said corresponding script description for said script.

4. The method of claim 2 wherein said completion indicator is displayed as textual information.

5. The method of claim 4 further wherein said textual information is displayed using a unique color for each type of completion indicator.

6. The method of claim 1 further comprising performing said method when said operating system is being unloaded from said computer.

7. The method of claim 1 wherein textual output data produced by said script is directed to a data file within said computer system, and said textual output data is not displayed on a console device of said computer system.

8. A method of changing an operating system within a computer system from an initial run level to a target run level, said method comprising the steps of:

(a) selecting at least one script to be displayed and executed to complete said changing, wherein each script performs at least one program;

(b) first executing each script selected in step (a) while providing data to each script selected in step (a) to cause each script selected in step(a) to only return a script description and not perform said at least one program; and (c) displaying each script description returned in step (b) before executing each script selected in step (a) a second time while providing data to each script selected in step (a) to cause each script selected in step (a) to perform said at least one program.

9. The method of claim 8 further comprising the step of:

(d) displaying a completion indicator along with said corresponding script description after each script is executed said second time.

10. The method of claim 9 wherein step (c) further comprises the following step (c1), and wherein step (d) further comprises the following step (d1):

(C1) displaying a list of said corresponding script descriptions on an output console device of said computer system prior to executing a first of said at least one script; and (d1) displaying said completion indicator for each script on a same a line of said output console device that contains said corresponding script description for said script.

11. The method of claim 9 wherein said completion indicator is displayed as textual information and further wherein each type of completion indicator is displayed using a unique color.

12. The method of claim 8 wherein textual output data produced by said script is directed to a data file within said computer system, and said textual output data is not displayed on a console device of said computer system.

13. The method of claim 8 wherein initial loading of said operating system initializes said operating system to a first predefined run level.

* * * * *